Nov. 8, 1932.  T. C. PEW  1,886,579

GRINDING MACHINE

Filed Aug. 12, 1930  2 Sheets-Sheet 1

INVENTOR
Thomas C. Pew
BY
Francis D. Hardesty
ATTORNEY

Nov. 8, 1932.                T. C. PEW                1,886,579
                          GRINDING MACHINE
                      Filed Aug. 12, 1930        2 Sheets-Sheet 2
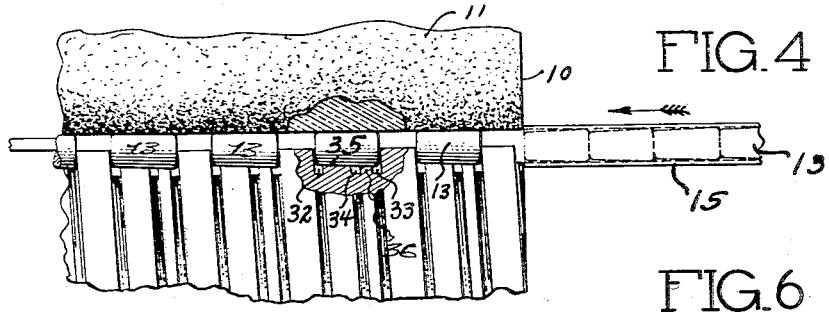
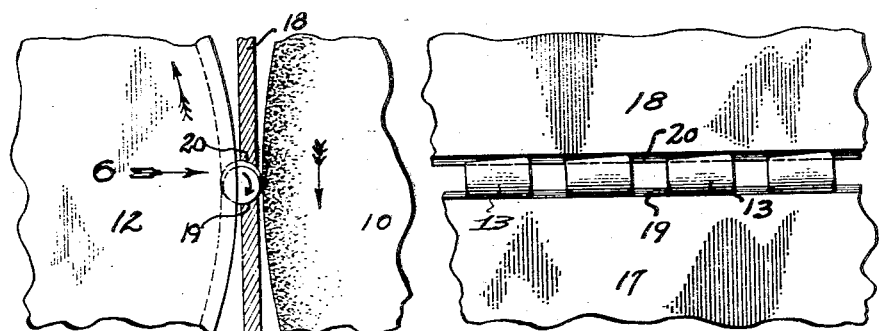
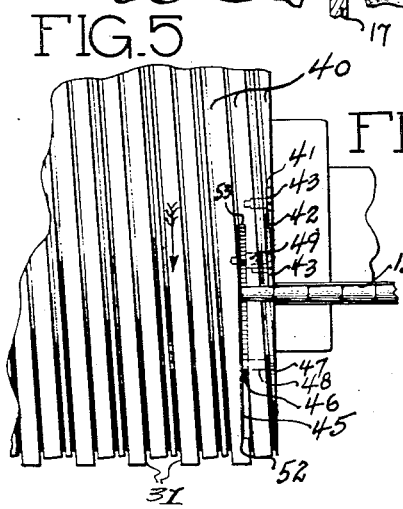
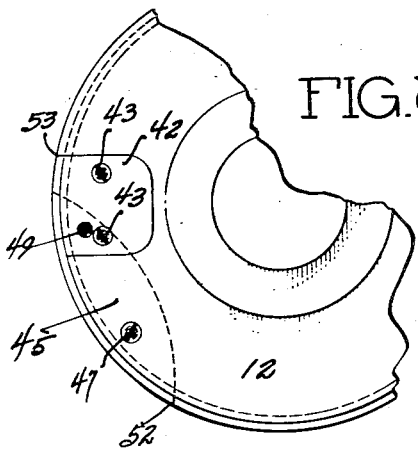
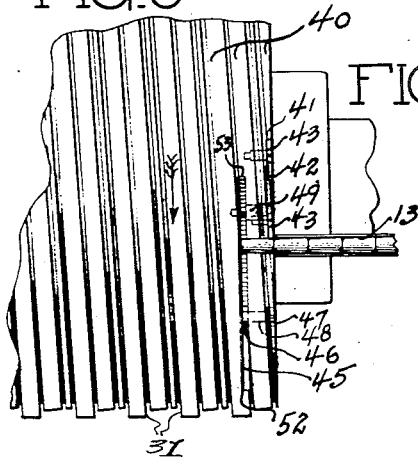
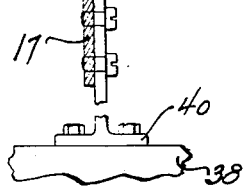
INVENTOR
Thomas C. Pew
BY Francis D. Hardesty
ATTORNEY Patented Nov. 8, 1932

1,886,579

UNITED STATES PATENT OFFICE

THOMAS C. PEW, OF ANN ARBOR, MICHIGAN, ASSIGNOR TO HOOVER STEEL BALL COMPANY, OF ANN ARBOR, MICHIGAN, A CORPORATION OF MICHIGAN

GRINDING MACHINE

Application filed August 12, 1930. Serial No. 474,752.

This invention relates to precision grinding machines and more particularly to machines for grinding tapered rollers, similar to those found in tapered roller bearings.

An object of this invention is a grinding machine provided with a grinding wheel and control means comprising a drum or mandrel adjacent the latter and adapted to regulate the speed of the tapered roller blanks across the grinding face of the wheel.

A further object is a novel form of support for the blanks as they are being acted upon and as they move across the face of the wheel, the support including a trough for the blanks.

A further object is a novel form of mandrel, or drum in a machine of the character described, one which is in the nature of a spirally grooved drum and which controls the movement of blanks in a straight path across the face of the grinding wheel, at the same time permitting rotation of each blank in its line of movement.

A further object is a novel form of mandrel so made and so mounted as to insure great accuracy in the grinding operation.

A still further object is a novel method of manufacturing a drum or mandrel, useful particularly with precision grinding machines.

A still further object is a novel form of mandrel for tapered rollers, one which is provided with a spiral groove in its periphery, the groove being of a novel form and configuration, whereby the maintaining of accuracy in the grinding of the roller blanks is assured.

A still further object is a novel method of manufacturing spirally grooved drums or mandrels useful with precision grinding machines.

A still further object is a novel form of roller or blank feeding means, one which includes a knife edge adapted to be interposed between adjacent incoming blanks and adapted to cause initial travel thereof, the mandrel being provided with a spring in its spiral surface adapted to cooperate with the knife edge to cause initial movement of each blank.

A still further object is a novel form of blank supporting means including a hardened steel, adjustable trough in which the work moves adjacent the grinding wheel.

Still further objects will readily occur to those skilled in the art upon reference to the following description and the accompanying drawings in which Fig. 1 is an elevation view of the machine, parts being shown in section.

Fig. 4 is an enlarged sectional plan view of parts of the machine.

Fig. 5 is an enlarged sectional end view.

Fig. 6 is a view of the work trough as if in the direction of the arrow 6 of Fig. 5, the drum or mandrel being removed.

Fig. 7 is an enlarged front view showing the knife edge and feeding spring in place.

Fig. 8 is an end view, as if looking from the right of Fig. 7.

Fig. 9 shows one form of the plate supporting means.

Figure 3:
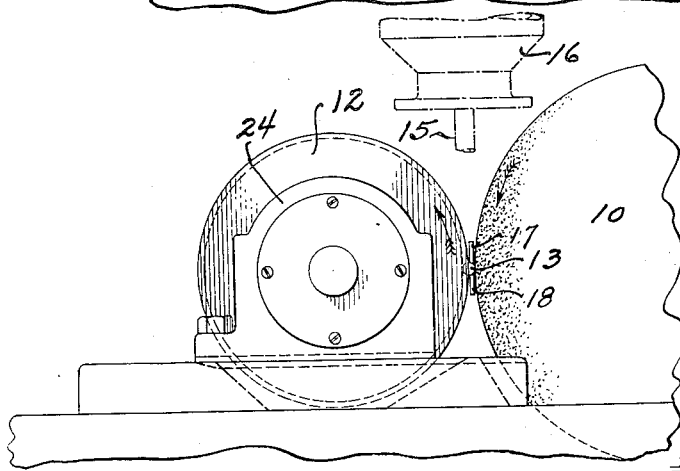
Fig. 3 is an end view, as if looking from the right of Fig. 1.

As indicated in the drawings, the machine includes a rapidly rotating grinding wheel 10 having a relatively wide face 11 across which the tapered roller blanks are adapted to move, there being a slowing rotating spiral drum or mandrel 12 adapted to rotate and to regulate endwise movement of the blanks 13 in their movement from right to left as indicated. The mandrel 12 and the wheel 11 rotate in the same direction, counterclockwise as indicated in Fig. 3, so that the blanks 13 rotate in a clockwise direction. By virtue of the relatively low speed of rotation of the mandrel 12, grinding action for a sufficient length of time is assured, too rapid endwise movement of the blanks being prevented. Furthermore, too rapid rotation of the blanks is prevented by the mandrel 12 which revolves at a lower speed than does the wheel 10.

A feeding tube 15 leading from a hopper 16 and leading to the space or trough between the work supporting plates 17 and 18, is adapted to permit gravitational endwise movement of the rollers 13 from the hopper to the trough between plates 17 and 18, whereupon the drum 12 picks up a roller, in a manner to be described later, and regulates its movement across the grinding wheel until it has reached the end thereof, whereupon it is discharged.

It will, of course, be understood that the rollers are fed with the small ends facing in the same direction. In the machine shown, the small ends face to the left, whereby the rollers are fed to and in the machine, small end first.

Figure 1:
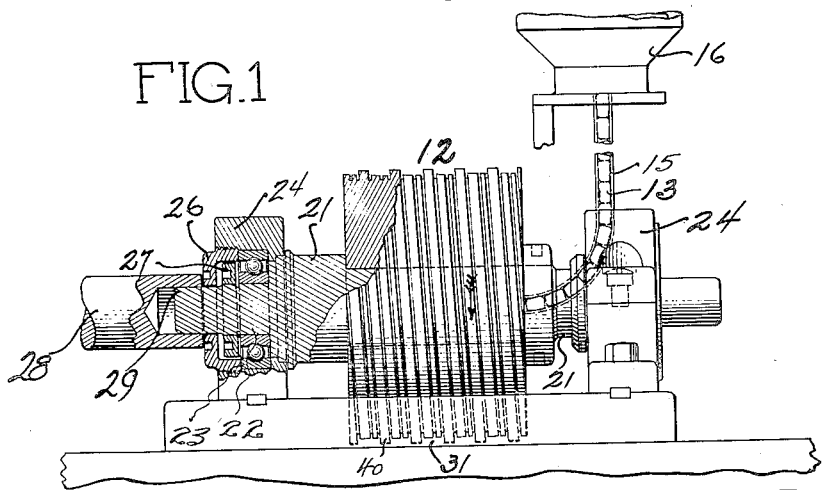

One of the important features of this invention is the construction of the mandrel 12. In view of the extreme accuracy that is necessary in machines of this character and in view of the fact that the rollers are pressed against the face of the wheel by the mandrel, it is important that the latter be manufactured in such a manner as to insure constant and non-varying pressure against the roller 13. Accordingly, the mandrel 12 is made from a billet of metal which is turned down to provide shaftlike ends 21 (Fig. 1) integral with the main body of the mandrel 12. The ends are further reduced, as indicated at 22, and a ball bearing or journal 23 is forced on the portion 22, as indicated in Fig. 1.

It will be observed that when a particular pair of journals have been mounted on the mandrel, they are never removed therefrom, its shaftlike portions, and its journals forming a unit which is not to be disassembled or disintegrated.

Figure 2:
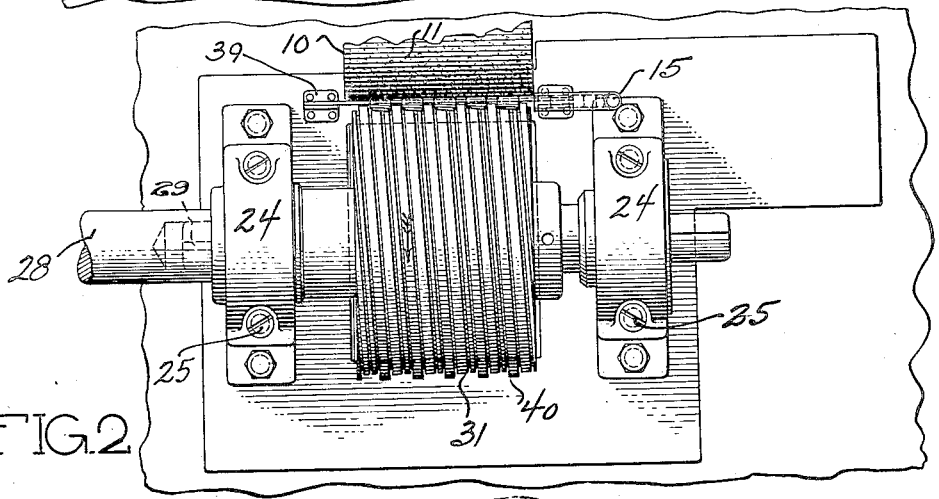
Fig. 2 is a plan view, looking downwardly upon the structure shown in Fig. 1.

The shaftlike end 21 with its journal 23 is then inserted in a stationary bearing 24, which may be of the usual split bearing type, the parts being held together by the usual bolts 25 as shown in Fig. 2. A nut 26 is threaded into the bearing 24 and surrounds a thrust plate 27 so as to maintain the mandrel in its position in the bearings 24.

In order to impart rotation to the drum, or mandrel, a rotating drive shaft 28 connected to a motor or the like, is keyed to the shaftlike end 21 by means of a key 29. When interchange or replacement of mandrels 12 is desired for any reason, the mandrel with its original pair of journals 23 is mounted upon the bearings 24 as a unit, thus insuring accurate alignment of the main body of the mandrel 12 with respect to the machine as a whole, regardless of slight tolerance in the position of the drive shaft 28, as well as of other parts.

In the manufacture of the mandrel, after the shaft like ends have been provided and after the journals 23 have been secured thereto, the main body of the mandrel is finished and ground accurately, especially insofar as the groove 31 is concerned, it being extremely important that the grooves be accurately aligned with respect to the journals 23 upon which the mandrel 12 rotates.

Another feature of the invention disclosed best in Fig. 4, is the construction of the spiral groove 31 in which the rollers 13 are supported and held by the mandrel 12 against the grinding wheel 10. The groove 31 is spirally wound, with its base at an angle to the wheel 10, and is provided with a pair of relief grooves 32—33 at its marginal edges, whereby accurate grinding of the base and sides of the groove is facilitated.

In view of the fact that the rollers 13 are tapered, it is obvious that that portion of the groove 31 which engages the smaller end of the roller 13 will be subjected to a greater wearing influence than will be other portions of the groove. Accordingly, a spacing groove 34 is provided between grooves 32 and 33 at a greater distance from the groove 32 than from the groove 33, whereby a wide rib at 35 and a narrow rib at 36 are formed. The rib 35, being wider than the rib 36, wears at the same rate as does the rib 36, and accordingly the groove 31 is not varied in contour from its initial formation and accordingly accurate alignment of a roller 13 and accurate grinding thereof are assured.

Another feature of the invention resides in the hardened steel work supporting plates 17 and 18, between which is a space or trough in which the rollers 13 move and rotate. The plates are provided with arcuate edges 19 and 20, which cooperate when the plates are brought towards each other to form an arcuately based trough for the work, the plates 17 and 18 being supported in such a manner, between the wheel 10 and the mandrel 12 that the base of the trough is exactly in line and symmetrically disposed with respect to the centers of the wheel and mandrel. In Fig. 9, the plates are shown as supported on the base 38 by means of the element 39 whose foot 40 is bolted to the base, and to whose upright 41' the plates are bolted.

Still another feature of the invention resides in the means on the mandrel adapted to pick up the leading one of the rollers 13 as it comes from the feeding tube 15 and to support the roller until it has moved to a position where it will be supported by the plates 17 and 18 and by the mandrel itself, and such means is disclosed best in Figs. 7 and 8. The end of the spiral rib 40 which forms the spiral groove 31 is cut off at the point 41 and a hardened steel knife edge 42 is mounted in its place in the mandrel, and held therein by means of bolts 43. As the mandrel rotates, the hardened steel edge forces its way between adjacent rollers 13, that is to say, behind the leading one and just ahead of the next following roller causing the rollers to be separated from each other by the spirals of the drum or mandrel 12.

A thin spring plate 45, secured in an arcuate slot in the spiral of the mandrel made by a wheel cutter brought thereto is disposed at such an angle with respect to the ribs 40 as to be exactly transverse of the direction of the movement of rollers 13, that is to say, exactly parallel to the knife edge 42. The securing means for the spring plate 45 includes a nut 46 welded to the plate and engaged by a bolt 47 threaded therein and thru a smooth aperture 48 in the mandrel. A guide stud 49 projects thru the spring plate 45 to guide it and regulate its movement. The spring plate, which is substantially ovoid in shape, has its lower point 52 exactly flush with the surface of the conveyor, and its upper point 53, as well as all points between the screw and the point 53 are spaced from that portion of the conveyor immediately adjacent, so that it presents a surface parallel to the knife edge.

When the drum rotates and a roller 13 is forced to the left, by the knife edge, the roller is held against the knife edge by the spring tension of the plate 45, until it is sufficiently supported by the work plates 17 and 18 and by the spiral itself. The knife edge 42 and the spring plate 45 are made of extremely hard metal whereby undue wear on these parts will be prevented, it being necessary to make them separate to facilitate adjustment, removal and replacement, when desired.

It also will be observed that the mandrel 12 is hardened on its exterior, whereby the groove 31 and rib 40 will not wear as much as would be the case if the mandrel had not been so treated.

The operation of the machine is obvious from the foregoing. The rollers 13, as they leave the feeding tube 15, are held in the trough between the plates 17 and 18 by the knife edge 42 and the spring plate 45, and are then carried along the trough and rotated by the grinding wheel 10, they being held from too rapid advancement and too rapid rotation by the slower moving mandrel 12. In view of the fact that the base of each groove is at an angle to the face of the wheel 10, the tapered roller 13 will be maintained thereagainst at all times so that the roller will be accurately ground. When the roller has travelled across the entire face of the grinder 10 it drops out of the trough into a suitably provided work receiver.

It will be observed that extreme accuracy of grinding is provided by the construction shown. The mandrel and its journals, being a self contained unit, insures proper alignment of the groove 31 with respect to the journals and with respect to the wheel 10. Further, mandrel 12 is replaceable, as a unit, by another mandrel having a differently formed groove 31, when different rollers are to be ground, without endangering the alignment of the base of groove 31 with respect to the face 11.

Now having described the invention and the preferred embodiment thereof, it is to be understood that the said invention is to be limited, not to the specific details herein set forth, but only by the scope of the claims which follow:

1. The method of manufacturing and mounting an externally grooved grinding machine mandrel or drum and thereby insuring accurate positioning and axial rotation thereof which comprises accurately grooving and forming said drum and the drum shaft with which it rotates from a single piece of stock so that they are integral with each other, securing journals to projecting ends of said drum shaft, supporting said journaled ends in bearings, regulating the end play of said drum and shaft by threading into said bearing a nut through which a journaled drum shaft end projects, said nut bearing against an annular formation on said shaft end, and coupling an axially rotating driving means to one of said projecting ends.

2. A spiral feed drum for grinding machines for elongated tapered rollers having a peripheral spiral feeding groove whose base is at an angle with respect to the axis of rotation and the peripheral wall of said drum and to the axis of rotation and peripheral wall of the grinding wheel, said feeding groove being provided with identically pitched and wound supplementary spiral groove intermediate and at unequal distances from its margins, whereby an identically pitched and wound wide rib and an identically pitched and wound narrow rib are formed in said groove.

3. A spiral feed drum for grinding machines for elongated tapered rollers having a peripheral spiral feeding groove whose base is at an angle with respect to the axis of rotation and peripheral wall of the grinding wheel, said feeding groove being provided with identically pitched and wound supplementary spiral groove intermediate its margins, the distance between said supplementary groove and the margin on the deeper portion of said feeding groove being less than the distance between said supplementary groove and the other margin of said feeding groove.

4. In a machine of the class described, an axially rotating spirally ribbed drum having means carried thereby and forming part thereof for removing rollers from a tube in which they are disposed end to end.

5. A mandrel adapted to remove rollers from a tube in which they are disposed end to end, and to regulate the movement of said rollers along a work supporting trough, said mandrel comprising an axially rotating spirally ribbed drum, the end of said spiral rib nearest the tube being provided with a knife edge for separating adjacent rollers and to hold back all behind the leading one of them.

6. A mandrel adapted to remove rollers from a tube in which they are disposed end to end, and to regulate movement of said rollers along a work supporting trough, said mandrel comprising an axially rotating spirally ribbed drum, the end of said spiral rib nearest the tube being provided with a knife edge for separating adjacent rollers and to hold back all behind the leading one of them, said drum being provided with an arcuate spring plate fixed therein a short distance from the knife edge and entirely within the periphery of a rib, and in a plane perpendicular to the axis of rotation of said drum, said spring plate serving to force and support the leading roller, that is to say, the one between it and the knife edge, against the latter for a limited time.

7. A mandrel adapted to remove rollers from a tube in which they are disposed end to end, and to regulate movement of said rollers along a work supporting trough, said mandrel comprising an axially rotating spirally ribbed drum, the end of said spiral rib nearest the tube being provided with a knife edge for separating adjacent rollers and to hold back all behind the leading one of them, said drum being provided with an arcuate spring plate fixed therein a short distance from the knife edge and entirely within the periphery of a rib, and in a plane perpendicular to the axis of rotation of said drum, said spring plate serving to force and support the leading roller, that is to say the one between it and the knife edge, against the latter for a limited time, said knife edge and spring being made of hardened steel or the like and being removably mounted in said mandrel, whereby they may be replaced, if desired.

8. A mandrel adapted to remove rollers from a tube in which they are disposed end to end and to regulate movement of said rollers along a work supporting trough, said mandrel comprising an axially rotating spirally ribbed drum, the end of said spiral rib nearest the tube being provided with a knife edge for separating adjacent incoming rollers and to hold back all behind the leading one of them, said drum being provided with an arcuate spring plate fixed therein a short distance from the knife edge and entirely within the periphery of a rib, and in a plane perpendicular to the axis of rotation of said drum, said spring plate serving to force and support the leading roller, that is to say the one between it and the knife edge, against the latter for a limited time, or until the drum carries it along said trough.

9. In a machine for grinding elongated, cylindrical or tapered, non-spherical rollers, a rotating grinding wheel, a rotating, feed-regulating, spiral drum adjacent said wheel, with its axis parallel to the axis of said wheel, means between said wheel and said drum and slotted to provide a trough in which said rollers move across said wheel, a feeding tube having a part axially aligned with the slot, and opening into the end of said slot and thru which the rollers are fed endwise into the latter, and means carried by and forming part of said drum to force a roller endwise out from said tube and endwise into the drum spiral.

10. In a machine for grinding elongated, cylindrical or tapered, non-spherical rollers, a rotating grinding wheel, a rotating, feed-regulating, spiral drum adjacent said wheel, with its axis parallel to the axis of said wheel, means between said wheel and said drum and slotted to provide a trough in which said rollers move across said wheel, a feeding tube having a part axially aligned with the slot, and opening into the end of said slot and thru which the rollers are fed endwise into the latter, and means carried by and forming part of said drum to force a roller endwise out from said tube and endwise into the drum spiral, and means also carried by and forming part of said drum to cooperate with said forcing means to support a roller until it is carried off by said drum.

11. A spiral feed drum for grinding machines for elongated tapered rollers, having a peripheral spiral feeding groove whose base is at an angle with respect to the axis of rotation and the peripheral wall of said drum and to the axis of rotation and peripheral wall of the grinding wheel, said feeding groove being provided with spiral relief grooves at its margins whereby accurate forming of the base and sides of the main groove is facilitated, the pitch and winding of the relief grooves and of the feeding groove being identical.

THOMAS C. PEW.